(No Model.) 3 Sheets—Sheet 1.
L. P. DOBYNS & A. BROWN.
MACHINE FOR ROLLING, CUTTING, AND SHAPING CANDY OR THE LIKE.
No. 503,230. Patented Aug. 15, 1893.

Witnesses:

Inventors,
Lemuel P. Dobyns,
& Alfred Brown,
By Hopkins & Atkins
Attorneys (No Model.) 3 Sheets—Sheet 2.

L. P. DOBYNS & A. BROWN.
MACHINE FOR ROLLING, CUTTING, AND SHAPING CANDY OR THE LIKE.

No. 503,230. Patented Aug. 15, 1893.

Witnesses:

Inventors,
Lemuel P. Dobyns
& Alfred Brown,
By Hopkins & Atkins
Attorneys

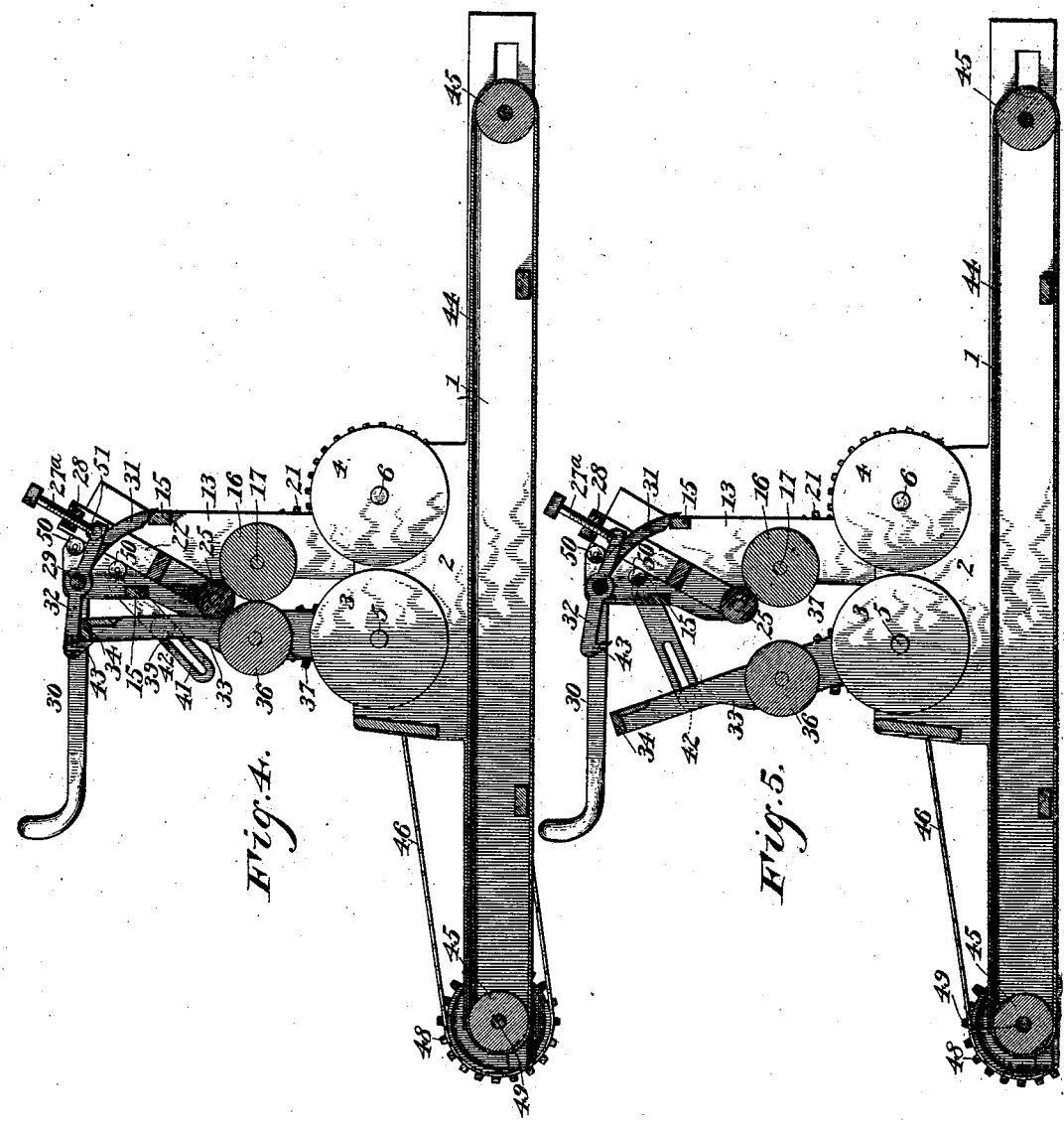

UNITED STATES PATENT OFFICE.

LEMUEL P. DOBYNS AND ALFRED BROWN, OF OGDEN, UTAH TERRITORY.

MACHINE FOR ROLLING, CUTTING, AND SHAPING CANDY OR THE LIKE.

SPECIFICATION forming part of Letters Patent No. 503,230, dated August 15, 1893.

Application filed June 6, 1892. Serial No. 435,664. (No model.)

*To all whom it may concern:*

Be it known that we, LEMUEL P. DOBYNS and ALFRED BROWN, of the city of Ogden, county of Weber, and Territory of Utah, have invented a certain new and useful Machine for Rolling, Cutting, and Shaping Candy, or the Like, of which the following is a specification, reference being had to the accompanying drawings.

The object of our invention is to produce improved mechanism for rolling, cutting, and shaping any plastic material, as for example candy, or the like.

Our invention consists in certain mechanism for rolling or reducing the plastic material to a predetermined uniform size; mechanism for automatically dropping the material after reduction between cutters; and mechanism for cutting this material and shaping it into the desired size, all of said mechanisms being organized together in a single machine.

Figures 1, 2:
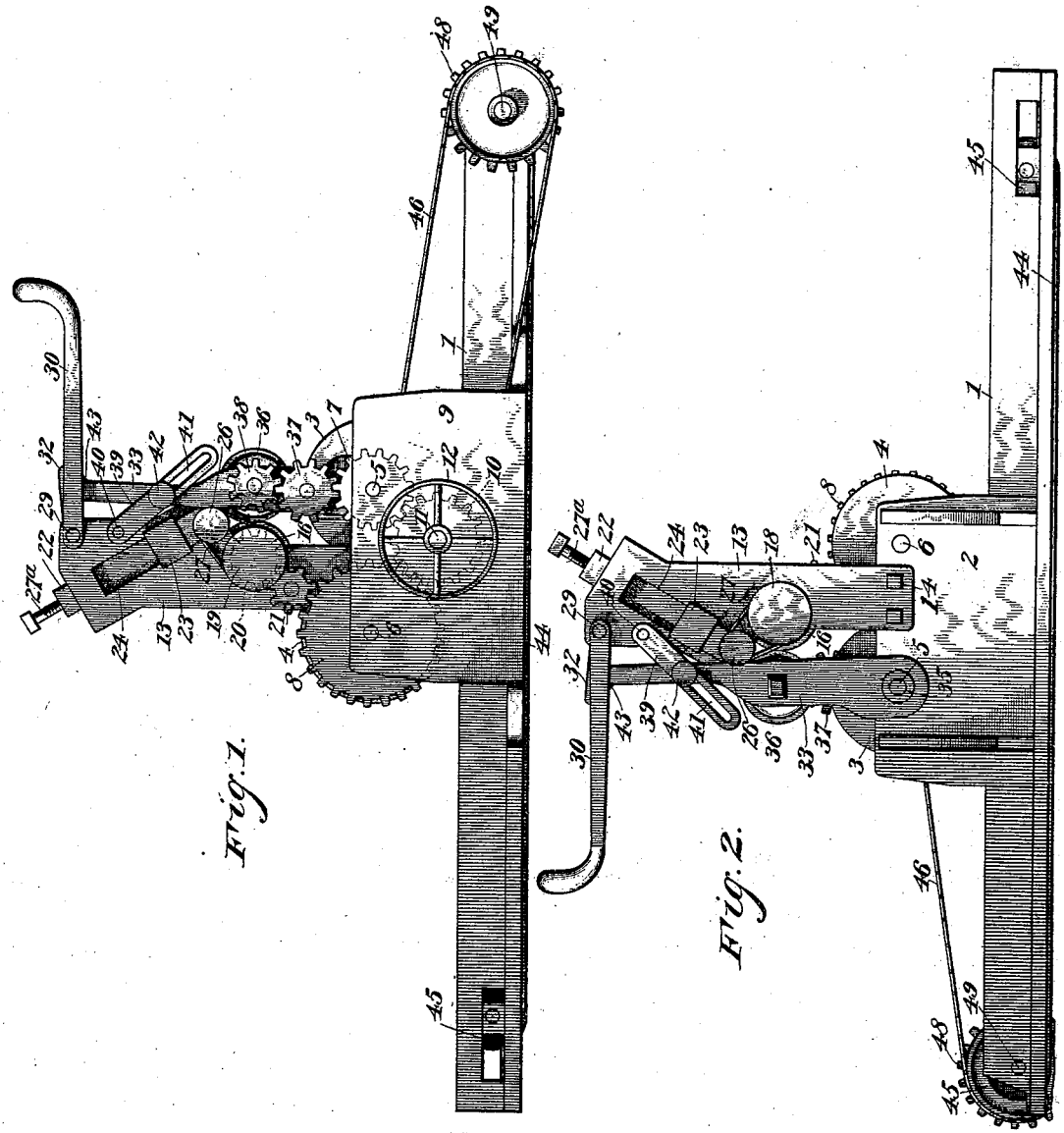
Figure 3:
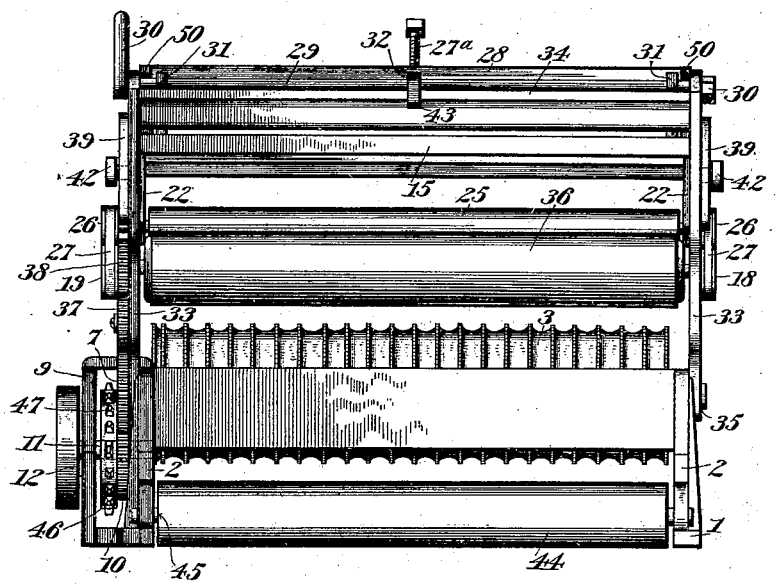
Figure 6:
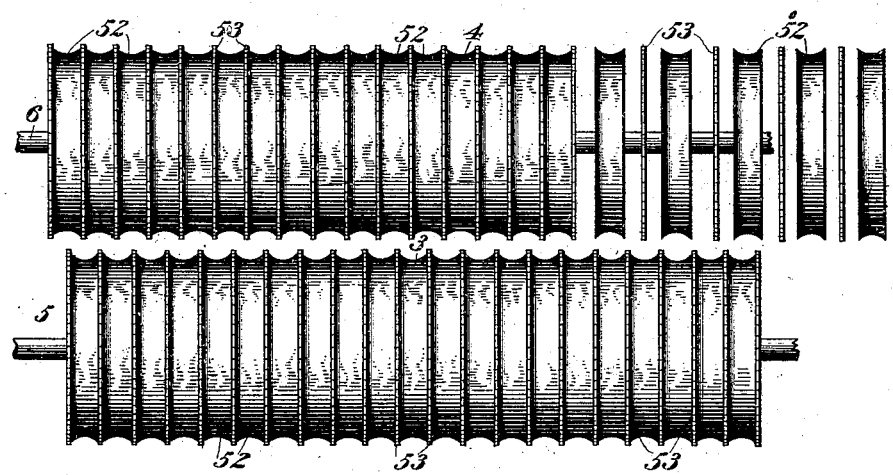

In the accompanying drawings, Figure 1 is a side elevation of our machine. Fig. 2 is a side elevation from the opposite side. Fig. 3 is a front elevation of the same. Fig. 4 is a central vertical longitudinal section, showing the parts in their relative positions previous to the shaping or reducing process. Fig. 5 is a similar view, showing the relative position of the parts after the shaping or reducing process has been completed. Fig. 6 is a top plan view of the cutting and shaping rollers, showing some of the saw and disks, which preferably compose them, removed to better illustrate their details of construction.

Referring to the figures on the drawings, 1 indicates the frame of my machine, which may be made of any desirable shape and size, and out of any suitable material.

2 indicates cutter-roller-bearings or uprights, and 3 and 4 cutter rollers carried therein.

5 and 6 indicate the respective shafts of the cutter rollers which are prolonged to carry gear-wheels 7 and 8.

9 indicates a gear carrying frame piece, into bearings in which the shafts 5 and 6 on one side are inserted. The gears 7 and 8 are confined between one of the uprights 2 and the frame-piece 9.

10 indicates an intermediate gear-wheel carried between the upright 2 and the frame-piece 9 by a shaft 11, and which is designed to be driven by a belt-pulley 12 for example secured to the shaft upon the outside of the frame-piece. The gear 10 meshes with the gears 7 and 8 to impart rotary motion to them. The relative proportions of the gears 7 and 8 are such that one will be rotated in one-half the time required to rotate the other. The speed of the roller 4 is therefore one-half that of the roller 3. The gear 10 drives both the rollers in the same direction.

13 indicates the two end pieces of the fixed roller frame, which are respectively rigidly fastened to the uprights 2, as indicated at 14.

15 indicates a cross-piece uniting the side pieces to form the frame.

16 indicates a reducing roller, revolubly mounted in the fixed roller frame upon the shaft 17. At one end the shaft carries upon the outside of the end piece 13 a pulley 18, and upon the other a pulley 19, and an inner gear wheel 20, both secured to the shaft. The gear-wheel 20 meshes with an intermediate stud-gear 21, which in turn meshes with the gear 8 from which it derives rotary motion.

22 indicates a reducing or press-roller-sliding-frame carried by guide blocks 23 in oblique slots 24 in the ends 13 of the roller-frame.

25 indicates a third reducing or press-roller carried in suitable bearings in the end of the press-roller frame, and carrying upon each end of its journals, upon the outside of the frame, pulleys 26.

27 indicate elastic bands by which the pulleys 18 and 19, and 26 are operatively connected, and by which rotary motion may be communicated to the press-roller without interfering with the movements of the sliding press-roller frame. The elastic belts serve to cause the sliding frame to seek the bottom of the slots in which it is carried; but any suitable means may be employed for this purpose, the object being to cause the press roller to bear yieldingly toward the reducing roller.

27ª indicates a set-screw carried in the cross-piece 28 of the press-roller sliding frame.

29 indicates a transverse shaft, to which is fixedly united at each end lever handles 30, and sliding-frame arms 31. By turning the lever-handle the sliding-frame arms may be caused to bear against the cross-piece 28 of the sliding frame and elevate it in opposition to the force of the elastic belts.

32 indicates a catch-lever pivoted to the shaft 29 and projecting at one end in the path of the set-screw 27$^a$. Consequently when the sliding frame is drawn down by the elastic belts, the set-screw is brought into contact with the catch-lever and tilts it upon its pivot. It is obvious from this explanation that the time of operation of the catch-lever will depend upon the adjustment of the set-screw. In other words, if the set-screw is set low the catch-lever will be tilted before the press-roll has reached its lowest limit of travel. If it is set high enough the press roller may descend to its lowest limit.

33 indicates the oscillatory or swinging roller frame having a top cross-piece 34, and pivoted to the uprights 2, as indicated at 35. This swinging frame carries in suitable bearings a second reducing roller 36 which is driven by the gear 7 through the intermediate stud-gear 37 and its own gear 38.

39 indicate arms pivotally secured to the fixed frame 13, as indicated at 40, and loosely pivoted, as by their slotted ends 41 riding over the studs 42 projecting from the sides of the swinging frame. The office of these arms is to limit the oscillatory motion of the swinging frame, which tends of its own weight to fall or swing away from the roller 16; but whose roller is held in contact therewith by the hook 43 of the catch-lever 32.

44 indicates an endless belt passing underneath the cutters and driven by rollers 45 mounted in the frame.

46 indicates a sprocket-band passing around pulleys 47 and 48, carried respectively upon the shaft 11 and the shaft 49 of the belt-roller. Anti-friction rollers 50 and 51 are preferably employed to give freedom of movement to the sliding press-roller frame in its bearings, and to cause the sliding-frame arms to ride freely against the cross-piece 34.

In operating our machine one of the lever-handles 30 is depressed until the sliding frame, and press-roller carried thereon, are elevated a proper distance. The stock or material to be rolled is then fed upon top of the reducing rollers 16 and 36 the machine having been previously set in motion. Upon feeding the machine and releasing the lever-handle the press-roller, yielding to the tendency of the elastic belts 27, begins to bear against the stock, the three rollers meantime revolving against it. The two reducing rollers and the intermediate press roller all rotate in the same direction, and confine the stock in the three sided space between the three rollers until it has been elongated and reduced to a cylinder of predetermined uniform diameter throughout. The diameter of the cylinder is determined by the adjustment of the set-screw 27$^a$, because, as above explained, the adjustment of this set screw controls the descent of the sliding-frame and press-roller. The distance of the press-roller from the other rollers determines the diameter of the material carried between them. Therefore, if the set-screw be set to trip the catch lever at a certain distance of the press-roller above the lower limit of its travel, the diameter of the material between the rollers will equal that distance. If the set-screw is adjusted differently, the diameter will be gaged accordingly.

It has been previously explained that the swinging-roller frame is held by the hook of the catch-lever. When the catch-lever is tilted by the set-screw 27$^a$, it releases the swinging-frame, which drops away and allows the reduced stock to fall between the reducing rollers upon the cutters and shapers. In other words, as soon as the required diameter of the stock has been reached, the machine automatically drops it upon the cutters and shapers. When the stock has been dropped one of the lever-handles 30, being depressed, they both bear against the studs 42 and restore the swinging frame to its former position, simultaneously elevating the sliding press-roller frame and preparing the machine for a repetition of the operation just described. In the meantime, however, the cylindrical roll of the stock has been caught between the cutters and shapers and separated thereby into distinct globules. The diameter of the cylindrical roll should be about that of the diameter of the balls to be formed by the shapers. Consequently the operation of severing the rolls and rounding of the square edges may be completed in a short space of time. As soon as the severed pieces of the roll have been converted to the size of the openings between the shapers, they will, of their own weight, assisted by the rapidly revolving roller 6 drop through those openings upon the endless belt conveyer 44 and be carried by it out from underneath the machine.

The cutters and shapers, as illustrated, are shown as regularly curved rollers. The manner of making these rollers and the shapes of the grooves in them may be varied in many ways. We illustrate in Fig. 6 of the drawings a preferable mode of construction. It consists of mounting upon the shaft 5 or 6 a succession of grooved disks 52 and circular saw-blades 53 arranged alternately. In this arrangement the saws form the medial ridges between the grooves, and, while they serve to define the grooves, also afford clean cutting edges for separating the stock. For the saw-blades, circular knife blades may be substituted. As previously suggested, the forms of the grooves may be modified indefinitely.

We do not limit ourselves to the details of construction herein shown and described, but reserve the right to modify and vary them at will within the scope of our invention.

What we claim is—

1. The combination with a frame, cutters and shapers, reducing mechanism and driving mechanism, of automatic stock dropping mechanism adapted to drop the stock upon the cutters and shapers after the completion of the operation of the reducing mechanism, substantially as set forth.

2. In a machine for shaping plastics, the combination with the cutters and shapers, of superimposed reducing rollers and a yielding press roller above the reducing rollers first named adapted to automatically separate them, substantially as set forth.

3. In a machine for shaping plastics, the combination with reducing, dropping and shaping mechanisms in the same vertical plane, of an endless conveyer beneath, and at right angles thereto, and driving mechanism operatively connected with the reducing, dropping and shaping mechanisms and with the conveyer, substantially as set forth.

4. The combination with a frame, cutters and shapers, and driving mechanism, of reducing rollers operatively connected with the driving mechanism, and a yielding press roller also connected therewith, substantially as and for the purpose specified.

5. The combination with the frame, cutters and shapers, reducing rollers, a rigid roller frame, a spring-actuated sliding press-roller frame, a press-roller carried thereon, and driving mechanism, all organized together, substantially as and for the purpose specified.

6. The combination with the frame, cutters and shapers, reducing roller, rigid roller frame and driving mechanism, of a sliding roller frame carried in the rigid roller frame and yieldingly connected with the driving mechanism, a spring roller frame and roller connected with the driving mechanism, a shaft upon the rigid roller frame, a catch-lever adapted to hold the swinging roller frame, and a set-screw in the sliding roller frame located in the path of the catch-lever, substantially as and for the purpose specified.

In testimony whereof we affix our signatures in presence of two witnesses.

LEMUEL P. DOBYNS.
ALFRED BROWN.

Witnesses:
WM. BINFORD,
CHAS. MEIGHAN.